Figure 1:
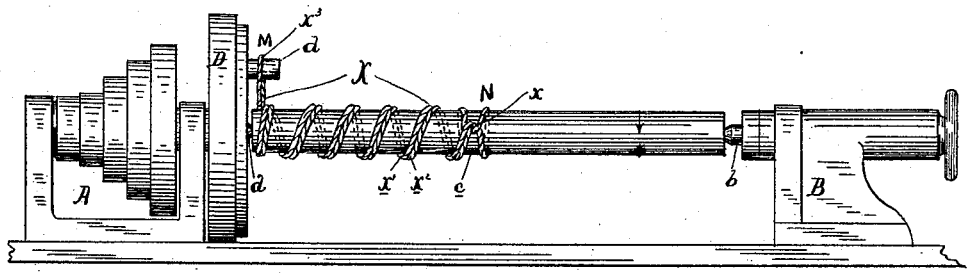

(No Model.) 2 Sheets—Sheet 1.

F. W. TAYLOR.
TURNER'S WORK CARRIER.

No. 420,614. Patented Feb. 4, 1890.

WITNESSES:
Joshua Matlack Jr.
Francis T. Chambers

INVENTOR
Frederick W. Taylor,
by his Attorney,
H. W. Van Pelt.

(No Model.) 2 Sheets—Sheet 2.

F. W. TAYLOR.
TURNER'S WORK CARRIER.

No. 420,614. Patented Feb. 4, 1890.

Fig. 7.ᵃ

WITNESSES:
Joshua Matlack, Jr.

INVENTOR
Frederick W. Taylor
by his attorney,
H. W. Harr Powel

UNITED STATES PATENT OFFICE.

FREDERICK W. TAYLOR, OF PHILADELPHIA, PENNSYLVANIA.

TURNER'S WORK-CARRIER.

SPECIFICATION forming part of Letters Patent No. 420,614, dated February 4, 1890.

Application filed June 25, 1889. Serial No. 315,514. (No model.)

*To all whom it may concern:*

Be it known that I, FREDERICK W. TAYLOR, a citizen of the United States, residing in the city and county of Philadelphia, in the State of Pennsylvania, have invented a certain new and useful Improvement in Turners' Work-Carriers, of which the following is a specification.

My invention, while it is especially adapted for use upon large engine-lathes which, acting with heavy cuts and broad-nosed tools upon shafts, axles, &c., require their work to be driven with great force, is also well adapted as a general carrier to transmit rotary motion in the machine tooling of many other rotatably mounted articles.

My chief object is to devise a carrier which will not only suffice to seize and drive the work when in the rough or first stages of "machining," but which will also suffice to drive it without appreciable mutilation when it becomes necessary in the final stages to lay hold of those portions of the work's external surface which, having been already tooled and finished to gage, it is highly inexpedient to mutilate or even risk to the grip or teeth of an ordinary "lathe-dog." Indeed it is well known that the damage to the finished portions of the work (or even to its rough body when its dimensions are tolerably close to the finished size) from the ordinary sorts of lathe-dogs, should they slip occasionally, is not only a matter of unsightly appearance and annoyance, but even of an appreciable percentage of failures in the production of merchantable or accurate articles. Moreover, in the effort to avoid these serious slippings between the dog and work there arises a yet more frequent, although possibly not so disastrous, sort of damage—for the workman, fearing a slip, clamps his dog to the work in the first instance with a pressure calculated to withstand the greatest strain that it may in his judgment be called upon to receive, and this practice also almost always leaves its marks upon the work. Therefore one of my further objects is to so fashion my carrier that it may be substantially self-tightening, and thereby adjust its grip in direct relation to the strains of service and never in needless excess, as is now the ordinary practice.

Another object is to devise the carrier so that it may be combined with the lathe-mandrel or equivalent rotary prime mover upon the duplex principle, the flexible tension member being in its preferred form combined not only to act after the manner of a mechanical "couple" upon the rotatable work without seriously disturbing the centering thereof, but also, in the furtherance thereof, to act, by reason of its being continuous, doubled, and ultimately attached (beyond its spiral coiling in a side-by-side fashion) so as to adjust itself and equalize the drag throughout.

Still other objects are in rendering said preferred form self-contained; to fashion the part thereof hereinafter designated the (equalizing) "drive-yoke" so that it may by its own contour prevent its passage endwise along a cylindrical piece of work; to make the attachments of the flexible tension member to such drive-yoke adjustable, together with such further objects as are apparent from the following description and claims.

Figure 2:
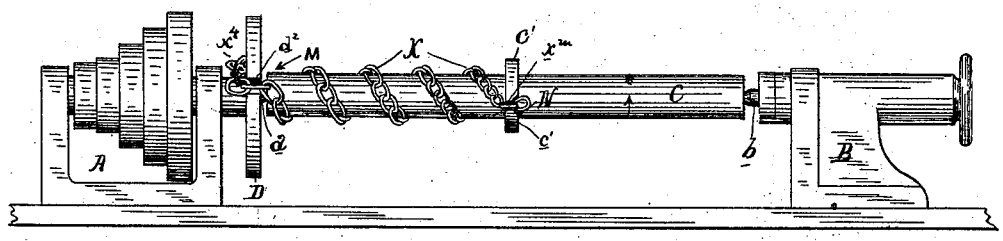
Figure 3:
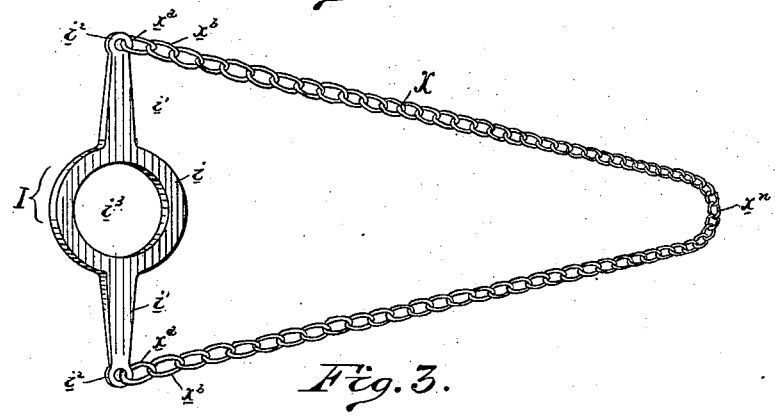
Figure 4:
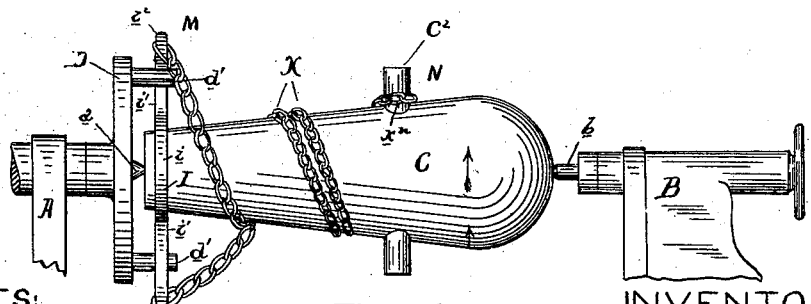
Figure 5:
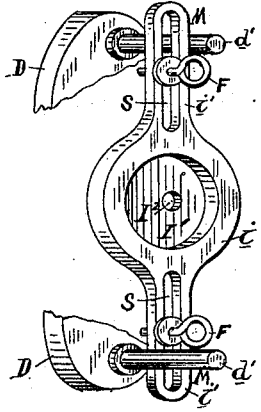
Figure 6:
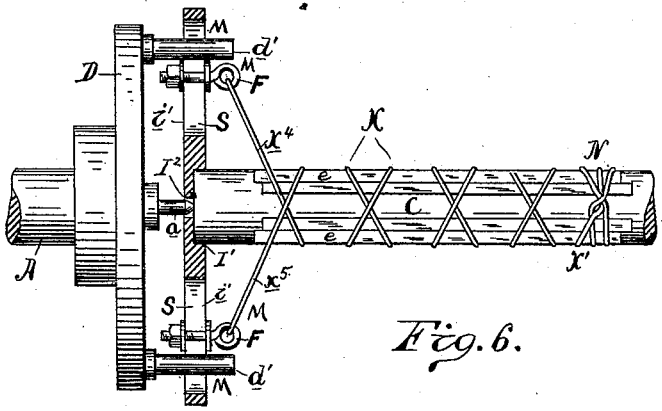
Figure 7:
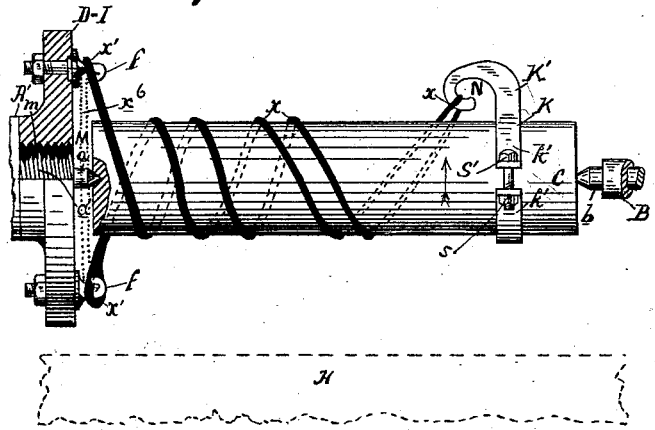
Figure 8:
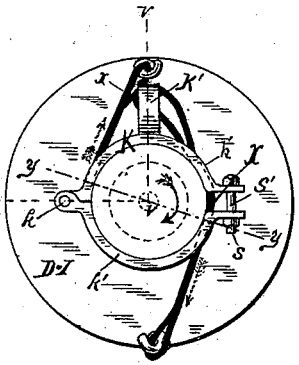
Figure 8:
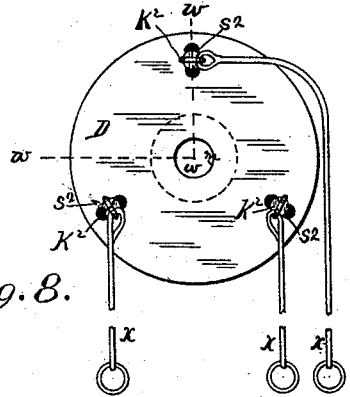
Figure 9:
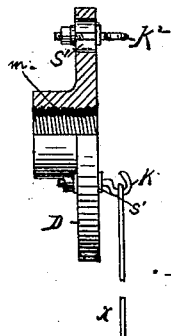

In its general nature my invention consists of combining with a lathe's rotative driving part a tension member, preferably a metallic chain of gradually-reducing size and strength, in such way that it can not only be wrapped spirally about the work to be driven, but also so that it may readily be secured to said work and lathe respectively. Now this "flexible tension member" of my improved carrier may be fashioned in a variety of ways, for it may comprise but one chain, cord, &c., applied in a single "part," or it may be a single member doubled and applied as a "bight," or two or more such chains, cords, &c.; and while in many cases a simple rope or chain of uniform cross-section answers sufficiently well I prefer to make the tension member tapering, as hereinafter described. Likewise, the tension member's attachment may be merely a knotting or a shackling of the chain, rope, &c., to the work on one hand and to any suitable portion of the lathe's actuating member on the other; or it may as to the latter, and preferably should, consist of a duplex actuating attachment. So, too, in the preferred form the attachment of the bight to the work, as I contrive it for the better equalization of the tension, is a mere looping of that bight about a hook, horn, clamp, or other projection, which may be either fast to or formed integral with the work instead of by a fixed attachment thereto; but reference now being had to the accompanying drawings, forming part of this specification, in which similar letters of reference indicate corresponding parts throughout the several figures, they will be found to illustrate my present invention as follows, to wit:

Figure 1 is a side elevation of the heads and shears of a lathe in which is centered as "work" a shaft, the whole equipped with my improved carrier in the form of an endless rope; Fig. 2, a similar elevation of a lathe and piece of centered work equipped with a modified form of the tension member as applied for actuation in the reverse direction to that shown in Fig. 1, the driving directions being indicated by the arrows placed upon the work in both these figures; Fig. 3, a detail view of a further modification of the carrier given in perspective by itself; Fig. 4, a side elevation of the carrier illustrated in Fig. 3 in act of communicating rotary motion to a cannon centered between the heads of a lathe, (shown fragmentarily;) Fig. 5, a detail of an equalizing drive-yoke; Fig. 6, a fragmentary side elevation of a lathe live head and piece of cylindrical work equipped with the yoke shown in Fig. 5, the drive-yoke being given vertically and in median cross-section; Fig. 7, a side elevation, partly in section, of my carrier applied to a cylindrical shaft, the drive-yoke being here in the form of a face-plate adapted to screw upon the lathe-mandrel, and the tension member looped about a removable adjustable hook-clamp for effecting the preferred or "sliding" attachment; Fig. 7$^A$, end view of structure shown in Fig. 7, the quadrant comprised between $v$—$v$—$v$ indicating the portion shown sectionally in the latter figure, the dot-and-dash line $y$—.—$y$ the normals to the tangential yoke attachments, the dotted arrows tensional strains, and the full-line one the direction of the work movement on rotation of the prime mover; Fig. 8, a modification of the driving attachment seen in front elevation; Fig. 9, a side elevation of the structure shown in Fig. 8, the quadrant comprised between the broken line angle $w$—$w$—$w$ being removed, the last two figures being also illustrative of a tripartite modification of the tension member.

In general, in the figures, X represents the tension member; A and B, (see Figs. 1, 2, 3, and 6) a lathe's "live" and "puppet" heads, respectively, of which $a$ and $b$ are the centers upon which the work C is supported, and D the face-plate, armed in Fig. 1 with an ordinary single drive-stud $d$ in Figs. 4, 5, and 6 with diametrically-opposite ones $d'$ $d'$, and in Fig. 2 with a drive-gap, the radial slot $d^2$. So M and N, Figs. 1, 2, and 4, indicate the places of terminal engagements between the flexible tension member, the work, and the lathe's ordinary face-plate, respectively, whereas, in Fig. 7, as the yoke itself is here fashioned in the form of a screw-engaging face-plate designated D I, the attachment M is in reality the union of the mandrel-nose, by its screw $a'$ and collar A', to the corresponding screw-threaded central orifice $m$ of said face-plate drive-yoke D I.

Specifically, Fig. 1 shows the spirally-flexible tension member X in form of an ordinary endless rope of manila, rawhide, wire, or equivalent fibrous material looped in a noose about the intermediate body $c$ of the work C by being passed through its own bight $x$ and thence wrapped continuously with its two parts $x'$ $x^2$ lying in a double spiral about the work in the direction of the live center $a$, until, coming within range of the aforesaid drive-stud $d$, it passes tangentially from the work's side and embraces that stud with its second bight $x^3$.

Fig. 2 shows a very simple form of my carrier—a single tapering drive-chain attached at its larger and stronger end by a knotting of its links at $x^4$ to prevent their being drawn through the face-plate drive-slot $d^2$, whence it passes spirally about the work C until its other end having its next to last link $x^m$ turned edgewise, it is thereby shackled to a narrow radial slot $c'$, which happens to exist in this case upon the integral collar C', of the aforesaid work.

Fig. 3 shows an eye-yoke I, whose central collar $i$ is adapted to girdle the end of the work, and whose arms $i'$ $i'$ are attached by the terminal eyes $i^2$ $i^2$, as an intermediate equalizing drive-link, to the ends of the doubled centrally-tapering drive-chain X, whose links $x^a$ $x^b$, &c., thence gradually, link for link on either part, decrease in size and tensile strength to a minimum and weakest central portion, the link $x^n$.

Fig. 4 shows the structure last described applied to driving a piece of work C in the form of a cannon, the increased tapering of whose sides, fitting as a plug into the eye $i^3$ of the yoke's collar, prevents the same from being drawn farther along the cannon's "chase;" for such a result would otherwise be the natural consequence of the driving strains. The other point of attachment for the carrier is here illustrated—as the passing its bight $x$ about the trunnion C$^2$. The yoke I also serves here with its arms $i'$ $i'$ as a symmetrical abutment for the double drive-studs $d'$ $d'$, from whence it transmits the driving-power to the continuous spirally-wound body of the chain X, the whole arrangement co-operating to keep the yoke's arms within range of the drive-studs, as well as to cause the chain, should it not be assembled fair and even, to slip its bight automatically about the trunnion C$^2$ and justify itself.

Figs. 5 and 6 show how, where the work has a cylindrical or non-tapering end presented to the live head of the lathe, in order to prevent the winding together of the tension member's coils, and the consequent drawing of the yoke-link to which they are attached toward their other point of attachment to the work's body, and so out of range of the drive stud or studs, I have abutted this yoke on the work's end, for the perforation $l^2$ of the yoke I being in this case of sufficient size to permit of the thrusting through it of the live center $a$ with an ample clearance and the chamber comprised between the inside of the collar I's walls and the diaphragm I' (preferably formed integral therewith) that chamber affords a convenient means of at least rudely centering the yoke by the body of the work, instead of depending directly upon the lathe or its center $a$ for that purpose. (See Fig. 6.)

Fig. 5 shows in the slots S S and screw-clamping eyebolts F F the tension member's part's ends adjustably fixed along the yoke-link's arms.

Fig. 6 illustrates a modified form, wherein a tension member knotted to the work's body with a "clove-hitch" X' is thence wrapped crosswise in opposite intersecting spirals over fenders or guard-strips $e$ $e$, (say, of copper or other suitable material,) placed about the work's body and finally passed to a chambered drive-link I I' I$^2$. This figure also indicates how the drive-studs $d'$ may be passed through the slots S of the yoke-link's arms $i'$, a method of assembling which is especially useful in connection with cross-wrapping of the double tension member, and while such intersecting opposite winding gives my improved turner's work-carrier the power to actuate in either direction without first unwrapping, and, second, rewrapping in the contrary direction to that in which its spirally-flexible tension member was first passed about the work, the more uneven pressure thereof, due to the crossing of the tension-spires, may produce mutilation of unguarded work; but as there is also in this case a certain sidewise-forcing tendency of the work upon the lathe-center, the parts $x^4$ $x^5$ passing tangentially from the same instead of from opposite sides of the work C, I therefore generally prefer to pass the spires in one direction only, as hereinbefore more particularly described. However, even then, if the work is of an intrinsically soft, yielding, or highly-polished nature, (say an annealed-steel print-roll or a journal,) it is within the purview of my invention to use interposed guard-fenders, as $e$ $e$, &c., in conjunction with any or all of the modifications of my device, however wound. For, while I lay great stress upon the capacity which my improved carrier has for laying hold of naked work without mutilating the same as much as is ordinarily the case, I do not wish to be understood as thereby declaring it to be so perfect that the ordinary adjuncts preventive of "work-dog" mutilation may be wholly dispensed with by reason of its mere use. Likewise the fact that the radial pressure of my device is graduated from a point of minimum radial constriction (at the place of attachment to the work-body N) to one of maximum constriction, (viz., at the point or points of the tension member's tangential departure for the driver attachment M or M M,) as well as distributed over a considerable area of the work's body by the spires of the tension member, forms one of its striking advantages—this whether it be applied directly upon the work or intermediate through guards $e$, &c., for the sake of its still greater diffusion.

Continuing with the specific description of illustrations, Figs. 7 and 7$^A$ show a convenient way of securing the work to the bight of a looped or "double-part" tension member, which consists of simply engaging that member's bight $x$ about the hook or, preferably, curved horn K' of the removably-secured collar-clamp K, of which $k$ is a hinge, $k'$ $k'$ its sides, and S' $s$ its lock bolt screw and nut. Moreover, these Figs. 7 and 7$^A$ show, as above mentioned, the yoke formed integral with or rather as a lathe face-plate itself; and while the tendency of the spires of the tension member is here not only to constrict the work C when the lathe-mandrel is rotated, but also in a certain degree to bring its points of attachment M N together, the latter tendency is here restrained by the anchorages of the clamp K on the one hand to the work's body, and that of said yoke face-plate's screw attachment at M to the lathe's mandrel-nose $a'$ on the other, so that the resultant lengthwise strains arising from this cause are absorbed in the lathe-shears, designated H, while the torsional or driving strains proper, being delivered through the medium of D I at opposite points and at equal distances—that of the work's radius—from the center of rotation, they here co-operate with the said tension member's self-adjusting bight attachment to the horn-clamp K, not only to justify it, X, and equalize the drag on either part thereof, but also, from the very fact of so doing and said part's aforesaid tangential passage from the ends of opposite radii, to actuate the intermediate work substantially as a mechanical "couple." This is graphically illustrated in Fig. 7$^A$. Fig. 7, by the dotted line $x^6$, also indicates how, by simply making the tension member X endless and looping it about the hooks F F, instead of attaching its ends thereto by independent loops at $x'$ $x'$, the preferred two-part bight form is preserved and the endwise self-adjusting capacity of the now endless tension member considerably increased, the slight deflection and increase of friction due to passing the shank of the center $a$ being practically *nil*.

Figs. 8 and 9 show, instead of two, three independent tension members removably attached to the radially-disposed face-plate hooks K$^2$ K$^2$ K$^2$, whose screw and nut provided shanks (see $k^2$, Fig. 8) serve to engage them at any desired points along the ordinary face-plate slots S$^2$.

In general, as to operation, the lathe's live head being rotated, its engaging part or parts (whether the unilaterally-acting face-plate stud $d$ or gap $d^3$, or the duplex-actuating studs $d'$ $d'$, the yoke face-plate D I, or the tripartite drive-hooks $K^2$ $K^2$ $K^2$) delivering the strains to the tension member, has them thereby transmitted and delivered, for the greater part, at least, through the medium of its several spires to the body of the work, any slight circumferential slipping which may occur being restrained and taken up by the anchorage to the work at N. Now, this very slipping tendency, whenever productive of motion, is also, as hereinbefore mentioned, made applicable by my invention in its preferred form to effect the justification of its double-part tension member, with the consequent benefit of equalizing not only the pressure upon the arms of the drive-yoke, but also the radial and torsional strains delivered by the coils or spires to the work itself. Lastly, it may be proper in this connection to mention that the wrapping of the tension member into non-crossing spires may be effected after the attachments M N are made by simply revolving either the lathe's live head or else the work, the other being held motionless the while; but,

Having now fully described my invention, what I hereby desire to claim and secure by Letters Patent of the United States is—

1. The combination, with a lathe and a piece of work rotatably mounted therein, of a spirally-flexible tension member and operative devices for securing it on one hand to said work and on the other to said lathe's driving member, substantially as and for the purposes hereinbefore described.

2. The combination, with a lathe and a piece of work rotatably mounted therein, of two or more spirally-flexible tension members and operative devices for securing them on one hand to said work and on the other to said lathe's driving member, substantially as and for the purposes hereinbefore described.

3. The combination, with a lathe and a piece of work rotatably mounted therein, of a tapering spirally-flexible tension member and operative devices for securing it on one hand to said work and on the other to said lathe's driving member, substantially as and for the purposes hereinbefore described.

4. The combination, with a lathe and a piece of work rotatably mounted therein, of an endless spirally-flexible tension member and operative devices for securing it on one hand to said work and on the other to said lathe's driving member, substantially as and for the purposes hereinbefore described.

5. The combination, with a lathe and a piece of work rotatably mounted therein, of an endless bilaterally-tapering spirally-flexible tension member and operative devices for securing it on one hand to said work and on the other to said lathe's driving member, substantially as and for the purposes hereinbefore described.

6. The combination, with a lathe equipped with a duplex driving member and a piece of work rotatably mounted in said lathe, of a drive-yoke having opposite divergent arms adapted to engage said driving member, and a spirally-flexible tension member secured to said arms in a bight, substantially as and for the purposes hereinbefore described.

7. The combination, with a lathe equipped with a duplex driving member and a piece of work rotatably mounted in said lathe, of a drive-yoke having opposite divergent arms adapted to engage said driving member, and a spirally-flexible tension member secured to said arms in a bight, substantially as and for the purposes hereinbefore described.

8. The combination, with a lathe equipped with a duplex driving member and a piece of work rotatably mounted in said lathe, of a drive-yoke, a flexible tension member secured to opposite points of said yoke in a bight, and a horn operative for attaching said bight to said work with a sliding loop, substantially as and for the purposes hereinbefore described.

9. The combination, with a lathe equipped with a duplex driving member and a piece of work rotatably mounted in said lathe, of a drive-yoke having opposite radial arms and a central aperture, a spirally-flexible tension member adjustably secured to said arms, and an anchorage-clamp for securing said bight with a sliding loop to said work, substantially as and for the purposes hereinbefore described.

10. The combination, with a lathe, of a drive-yoke having a mandrel engagement, a spirally-flexible tension member secured to opposite points of said yoke in an endless endwise-sliding bight, a rotatably-mounted piece of work, and a tension-member hitching-clamp adapted to be secured to said work's body, substantially as and for the purposes hereinbefore described.

FREDERICK W. TAYLOR.

Witnesses:
GEORGE HOUSE,
ISAAC NORRIS, 3d.